US008717889B2

(12) United States Patent
Thomas

(10) Patent No.: US 8,717,889 B2
(45) Date of Patent: *May 6, 2014

(54) FLOW-CONTROL IN A SWITCH FABRIC

(75) Inventor: Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,385

(22) Filed: Aug. 24, 2012

(65) Prior Publication Data

US 2012/0320742 A1 Dec. 20, 2012

Related U.S. Application Data

(63) Continuation of application No. 12/345,490, filed on Dec. 29, 2008, now Pat. No. 8,254,255.

(51) Int. Cl.
*G01R 31/08* (2006.01)
*H04Q 3/68* (2006.01)
*H04L 12/50* (2006.01)

(52) U.S. Cl.
CPC . *H04Q 3/68* (2013.01); *H04L 12/50* (2013.01)
USPC .......................................... 370/230; 370/235

(58) Field of Classification Search
CPC .................................. H04Q 3/68; H04L 12/50
USPC .......................................... 370/229, 230, 235
See application file for complete search history.

(56) References Cited

U.S. PATENT DOCUMENTS

| 5,457,687 | A | 10/1995 | Newman |
| 5,926,473 | A | 7/1999 | Gridley |
| 5,987,008 | A | 11/1999 | Simpson et al. |

(Continued)

FOREIGN PATENT DOCUMENTS

| EP | 1 133 110 A2 | 9/2001 |
| EP | 1 653 685 A1 | 5/2006 |

(Continued)

OTHER PUBLICATIONS

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive.

(Continued)

*Primary Examiner* — Sai-Ming Chan
(74) *Attorney, Agent, or Firm* — Cooley LLP

(57) ABSTRACT

In some embodiments, an apparatus includes a module within a first stage of a switch fabric, a module within a second stage of the switch fabric, and a module within a third stage of the switch fabric. The module within the first stage is configured to send data to the module within the second stage. The module within the second stage is configured to send data to the module within the third stage. The module within the second stage is configured to send a first suspension indicator to the module within the third stage. The module within the third stage is configured to send a second suspension indicator to the module within the first stage in response to the first suspension indicator. The module within the first stage is configured to stop sending data to the module within the second stage in response to the second suspension indicator.

19 Claims, 9 Drawing Sheets

(56) References Cited

U.S. PATENT DOCUMENTS

| | | | |
|---|---|---|---|
| 5,987,028 A * | 11/1999 | Yang et al. | 370/380 |
| 5,991,295 A | 11/1999 | Tout et al. | |
| 6,049,546 A | 4/2000 | Ramakrishnan | |
| 6,073,089 A | 6/2000 | Baker et al. | |
| 6,324,165 B1 | 11/2001 | Fan et al. | |
| 6,370,145 B1 | 4/2002 | Dally et al. | |
| 6,438,107 B1 | 8/2002 | Somiya et al. | |
| 6,512,747 B1 | 1/2003 | Umeuchi et al. | |
| 6,618,357 B1 | 9/2003 | Geyer et al. | |
| 6,657,962 B1 | 12/2003 | Barri et al. | |
| 6,856,622 B1 | 2/2005 | Calamvokis et al. | |
| 6,944,173 B1 | 9/2005 | Jones et al. | |
| 6,973,032 B1 | 12/2005 | Casley et al. | |
| 6,977,932 B1 | 12/2005 | Hauck | |
| 6,986,161 B2 | 1/2006 | Billhartz | |
| 7,027,457 B1 | 4/2006 | Chiussi et al. | |
| 7,046,631 B1 | 5/2006 | Giroux et al. | |
| 7,061,862 B2 | 6/2006 | Horiguchi et al. | |
| 7,075,934 B2 | 7/2006 | Chiussi et al. | |
| 7,085,846 B2 | 8/2006 | Jenne et al. | |
| 7,173,931 B2 | 2/2007 | Chao et al. | |
| 7,185,368 B2 | 2/2007 | Copeland, III | |
| 7,230,947 B1 | 6/2007 | Huber et al. | |
| 7,233,568 B2 | 6/2007 | Goodman et al. | |
| 7,234,168 B2 | 6/2007 | Gupta et al. | |
| 7,269,666 B1 | 9/2007 | Leitner et al. | |
| 7,277,429 B2 | 10/2007 | Norman et al. | |
| 7,283,471 B2 | 10/2007 | Gutierrez et al. | |
| 7,324,442 B1 | 1/2008 | Pan et al. | |
| 7,327,680 B1 | 2/2008 | Kloth | |
| 7,372,813 B1 | 5/2008 | Cimino et al. | |
| 7,391,736 B2 | 6/2008 | Na et al. | |
| 7,403,524 B2 | 7/2008 | Hill | |
| 7,424,744 B1 | 9/2008 | Wu et al. | |
| 7,430,175 B2 | 9/2008 | Dropps et al. | |
| 7,440,448 B1 | 10/2008 | Lu et al. | |
| 7,457,245 B2 | 11/2008 | McAlpine et al. | |
| 7,519,860 B2 | 4/2009 | Hatonen et al. | |
| 7,540,025 B2 | 5/2009 | Tzadikario | |
| 7,543,052 B1 | 6/2009 | Cesa Klein | |
| 7,643,418 B1 | 1/2010 | Varier et al. | |
| 7,701,849 B1 | 4/2010 | Ma | |
| 7,719,982 B2 | 5/2010 | Varma | |
| 8,154,996 B2 | 4/2012 | Godbole et al. | |
| 8,160,072 B1 | 4/2012 | Gnanasekaran et al. | |
| 8,213,308 B2 | 7/2012 | Godbole et al. | |
| 8,218,442 B2 | 7/2012 | Godbole et al. | |
| 8,228,797 B1 | 7/2012 | Utley et al. | |
| 8,254,255 B2 | 8/2012 | Thomas | |
| 2002/0057699 A1 | 5/2002 | Roberts | |
| 2002/0064170 A1 | 5/2002 | Siu et al. | |
| 2002/0075883 A1 | 6/2002 | Dell et al. | |
| 2002/0080789 A1 | 6/2002 | Henderson et al. | |
| 2002/0118692 A1 | 8/2002 | Oberman et al. | |
| 2002/0154637 A1 | 10/2002 | Keller-Tuberg | |
| 2002/0167950 A1 | 11/2002 | Chang et al. | |
| 2003/0005145 A1 | 1/2003 | Bullard | |
| 2003/0023733 A1 | 1/2003 | Lingafelt et al. | |
| 2003/0026287 A1 | 2/2003 | Mullendore et al. | |
| 2003/0035432 A1 | 2/2003 | Sreejith et al. | |
| 2003/0058880 A1 | 3/2003 | Sarkinen | |
| 2003/0063348 A1 | 4/2003 | Posey | |
| 2003/0218977 A1 | 11/2003 | Pan et al. | |
| 2004/0001433 A1 | 1/2004 | Gram et al. | |
| 2004/0013124 A1 | 1/2004 | Peebles et al. | |
| 2004/0165598 A1 | 8/2004 | Shrimali et al. | |
| 2005/0036502 A1 | 2/2005 | Blanc et al. | |
| 2005/0108444 A1 | 5/2005 | Flauaus et al. | |
| 2005/0111460 A1 | 5/2005 | Sahita | |
| 2005/0138238 A1 | 6/2005 | Tierney et al. | |
| 2005/0138243 A1 | 6/2005 | Tierney et al. | |
| 2005/0210533 A1 | 9/2005 | Copeland et al. | |
| 2005/0226156 A1 | 10/2005 | Keating et al. | |
| 2005/0249214 A1 | 11/2005 | Peng | |
| 2005/0276263 A1 | 12/2005 | Suetsugu et al. | |
| 2006/0067225 A1 | 3/2006 | Fedorkow et al. | |
| 2006/0104298 A1 | 5/2006 | McAlpine et al. | |
| 2006/0120289 A1 | 6/2006 | Cunningham | |
| 2006/0123480 A1 | 6/2006 | Oh et al. | |
| 2006/0146703 A1 | 7/2006 | Cha et al. | |
| 2006/0272018 A1 | 11/2006 | Fouant | |
| 2006/0285548 A1 | 12/2006 | Hill et al. | |
| 2007/0064617 A1 | 3/2007 | Reves | |
| 2007/0067438 A1 | 3/2007 | Goranson et al. | |
| 2007/0086464 A1 | 4/2007 | Somashekhar | |
| 2007/0094729 A1 | 4/2007 | Hoefelmeyer et al. | |
| 2007/0118909 A1 | 5/2007 | Hertzog et al. | |
| 2007/0150949 A1 | 6/2007 | Futamura et al. | |
| 2007/0180526 A1 | 8/2007 | Copeland, III | |
| 2007/0192861 A1 | 8/2007 | Varghese et al. | |
| 2007/0240207 A1 | 10/2007 | Belakhdar et al. | |
| 2007/0268830 A1 | 11/2007 | Li et al. | |
| 2008/0028096 A1 | 1/2008 | Henderson et al. | |
| 2008/0028467 A1 | 1/2008 | Kommareddy et al. | |
| 2008/0080548 A1 | 4/2008 | Mullendore et al. | |
| 2008/0082977 A1 | 4/2008 | Araujo et al. | |
| 2008/0151863 A1 | 6/2008 | Lawrence et al. | |
| 2008/0198746 A1 | 8/2008 | Kwan et al. | |
| 2008/0253289 A1 | 10/2008 | Naven et al. | |
| 2008/0259798 A1 | 10/2008 | Loh et al. | |
| 2008/0263661 A1 | 10/2008 | Bouzida | |
| 2008/0285449 A1 | 11/2008 | Larsson et al. | |
| 2009/0003212 A1 | 1/2009 | Kwan et al. | |
| 2009/0077663 A1 | 3/2009 | Sun et al. | |
| 2009/0300209 A1 | 12/2009 | Elzur | |
| 2010/0061238 A1 | 3/2010 | Godbole et al. | |
| 2010/0061239 A1 | 3/2010 | Godbole et al. | |
| 2010/0061390 A1 | 3/2010 | Godbole et al. | |
| 2010/0085891 A1 | 4/2010 | Kind et al. | |
| 2010/0158031 A1 | 6/2010 | Thomas et al. | |
| 2010/0165843 A1 | 7/2010 | Thomas | |
| 2011/0154132 A1 | 6/2011 | Aybay | |
| 2011/0267942 A1 | 11/2011 | Aybay et al. | |
| 2011/0310739 A1 | 12/2011 | Aybay | |
| 2012/0140626 A1 | 6/2012 | Anand et al. | |
| 2012/0195203 A1 | 8/2012 | Godbole et al. | |
| 2012/0233349 A1 | 9/2012 | Aybay | |
| 2012/0269065 A1 | 10/2012 | Godbole et al. | |
| 2012/0275307 A1 | 11/2012 | Godbole et al. | |

FOREIGN PATENT DOCUMENTS

| | | |
|---|---|---|
| EP | 1 892 905 A1 | 2/2008 |
| EP | 2 040 420 A1 | 3/2009 |
| EP | 2 180 644 A1 | 4/2010 |
| EP | 2 461 529 A1 | 6/2012 |
| GB | 2 361 139 A | 10/2001 |
| WO | WO 97/04546 | 2/1997 |

OTHER PUBLICATIONS

William J. Daily, "Virtual-Channel Flow Control," IEEE Transactions on Parallel and Distributed Systems, vol. 3, No. 2, Mar. 1992, pp. 194-205.

Mohammad Alizadeh et al. Data Center TCP (DCTCP) SIGCOMM'10, Aug. 30-Sep. 3, 2010, New Delhi, India, Copyright 2010 ACM 978-1-4503-0201-2/10/08 (12 pages).

Cyriel Minkenberg et al. "Adaptive Routing for Convergence Enhanced Ethernet," In Proc Int Conf on High Performance Switching and Routing (HPSR), pp. 1-8, Jun. 22-24, 2009.

Office Action mailed Apr. 29, 2010 for U.S. Appl. No. 12/343,728 (21 pages).

Office Action mailed Oct. 15, 2010 for U.S. Appl. No. 12/343,728 (22 pages).

Office Action mailed May 2, 2011 for U.S. Appl. No. 12/343,728 (22 pgs).

Final Office Action mailed Oct. 7, 2011 for U.S. Appl. No. 12/343,728 (25 pgs).

Office Action mailed Mar. 26, 2010 for U.S. Appl. No. 12/242,224 (17 pages).

Office Action mailed Sep. 17, 2010 for U.S. Appl. No. 12/242,224 (9 pages).

(56) References Cited

OTHER PUBLICATIONS

Office Action mailed Aug. 9, 2011 for U.S. Appl. No. 12/242,224 (7 pages).
Office Action mailed Mar. 29, 2010 for U.S. Appl. No. 12/242,230 (11 pages).
Office Action mailed Sep. 17, 2010 for U.S. Appl. No. 12/242,230 (16 pages).
Office Action mailed Mar. 17, 2011 for U.S. Appl. No. 12/242,230 (11 pages).
Office Action mailed Oct. 6, 2011 for U.S. Appl. No. 12/242,230 (19 pages).
Office Action mailed May 23, 2011 for U.S. Appl. No. 12/558,118 (6 pgs).
Office Action mailed May 11, 2010 for U.S. Appl. No. 12/345,490 (12 pages).
Office Action mailed Oct. 15, 2010 for U.S. Appl. No. 12/345,490 (14 pages).
Office Action mailed Apr. 1, 2011 for U.S. Appl. No. 12/345,490 (14 pages).
Office Action mailed Aug. 19, 2011 for U.S. Appl. No. 12/345,490 (14 pages).
Office Action mailed Mar. 26, 2012, for U.S. Appl. No. 12/646,114.
Final Office Action mailed Jul. 19, 2012, for U.S. Appl. No. 12/646,114.
Office Action mailed Sep. 27, 2012 for U.S. Appl. No. 12/820,797, filed Jun. 22, 2010.
Office Action mailed Nov. 7, 2012 for U.S. Appl. No. 12/859,015, filed Aug. 18, 2010.
Non-Final Office Action for U.S. Appl. No. 12/771,413, mailed May 24, 2012.
Office Action mailed Nov. 27, 2012 for U.S. Appl. No. 13/541,080.
Search Report for European Application No. 09170041.9, mailed Nov. 23, 2009 (8 pages).
Examination Report for European Application No. 09170041.9, mailed Mar. 13, 2012 (7 pages).
Partial Search Report for European Application No. 11188568.7, mailed Feb. 22, 2012 (5 pgs).
Extended Search Report for European Application No. 12158266.2, mailed Jun. 29, 2012.
U.S. Appl. No. 12/859,015, filed Aug. 18, 2010, entitled "Fibre Channel Credit-Based Link Flow Control Overlay Onto Fibre Channel Over Ethernet" (41 pgs).
U.S. Appl. No. 12/953,149, filed Nov. 23, 2010, entitled "Methods and Apparatus for Destination Based Hybrid Load Balancing Within a Switch Fabric" (49 pgs).

\* cited by examiner

FLOW-CONTROL IN A SWITCH FABRIC

CROSS REFERENCE TO RELATED APPLICATION

This application is a continuation of U.S. patent application Ser. No. 12/345,490, filed Dec. 29, 2008, and entitled "Flow-Control in a Switch Fabric," now U.S. Pat. No. 8,254,255, which is incorporated herein by reference in its entirety.

BACKGROUND

Embodiments described herein relate generally to switch fabrics and more particularly to flow-control of switch fabrics such as Clos networks.

Clos networks are multi-stage switch networks that provide non-blocking connections between multiple input ports and multiple output ports. A non-blocking network is a network in which a data path through the network can always be established between an idle input port and an idle output port.

A three-stage Clos network, for example, has a middle stage connected between an input stage and an output stage. Each stage includes a plurality of modules. Each input stage module has multiple input ports (n) and is operatively coupled to each middle stage module. Similarly, each output stage module has n output ports and is connected to each middle stage module.

A circuit switched switch fabric is a switch fabric in which a dedicated data path is established between an input port and an output port before data is sent through the switch fabric. Thus, once the dedicated data path is established, the data is sent from the input module to the output module over the dedicated data path. In contrast, a cell switched switch fabric is a switch fabric that reroutes data packets at each stage of the switch fabric. Accordingly, no dedicated path is needed to send the data packets from an input port to an output port.

In a cell switched Clos network, if multiple data packets are sent to a single module within a stage of the switch fabric, transient congestion can occur. One solution to such a problem is to buffer the data within the modules prior to sending data to the next stage. Having a large buffering capacity on each module, however, is expensive and undesirable. Additionally, if the modules have a small buffering capacity, the modules might be forced to drop data due to lack of capacity. Dropping data due to transient congestion is also undesirable.

Thus, a need exists for a flow-control solution in a switch fabric that limits transient congestion and loss of data. Further, a need exists for a low-cost, effective, flow-control solution.

SUMMARY

In some embodiments, an apparatus includes a module within a first stage of a switch fabric, a module within a second stage of the switch fabric, and a module within a third stage of the switch fabric. The module within the first stage is configured to send data to the module within the second stage. The module within the second stage is configured to send data to the module within the third stage. The module within the second stage is configured to send a first suspension indicator to the module within the third stage. The module within the third stage is configured to send a second suspension indicator to the module within the first stage in response to the first suspension indicator. The module within the first stage is configured to stop sending data to the module within the second stage in response to the second suspension indicator.

DETAILED DESCRIPTION

Figure 1:
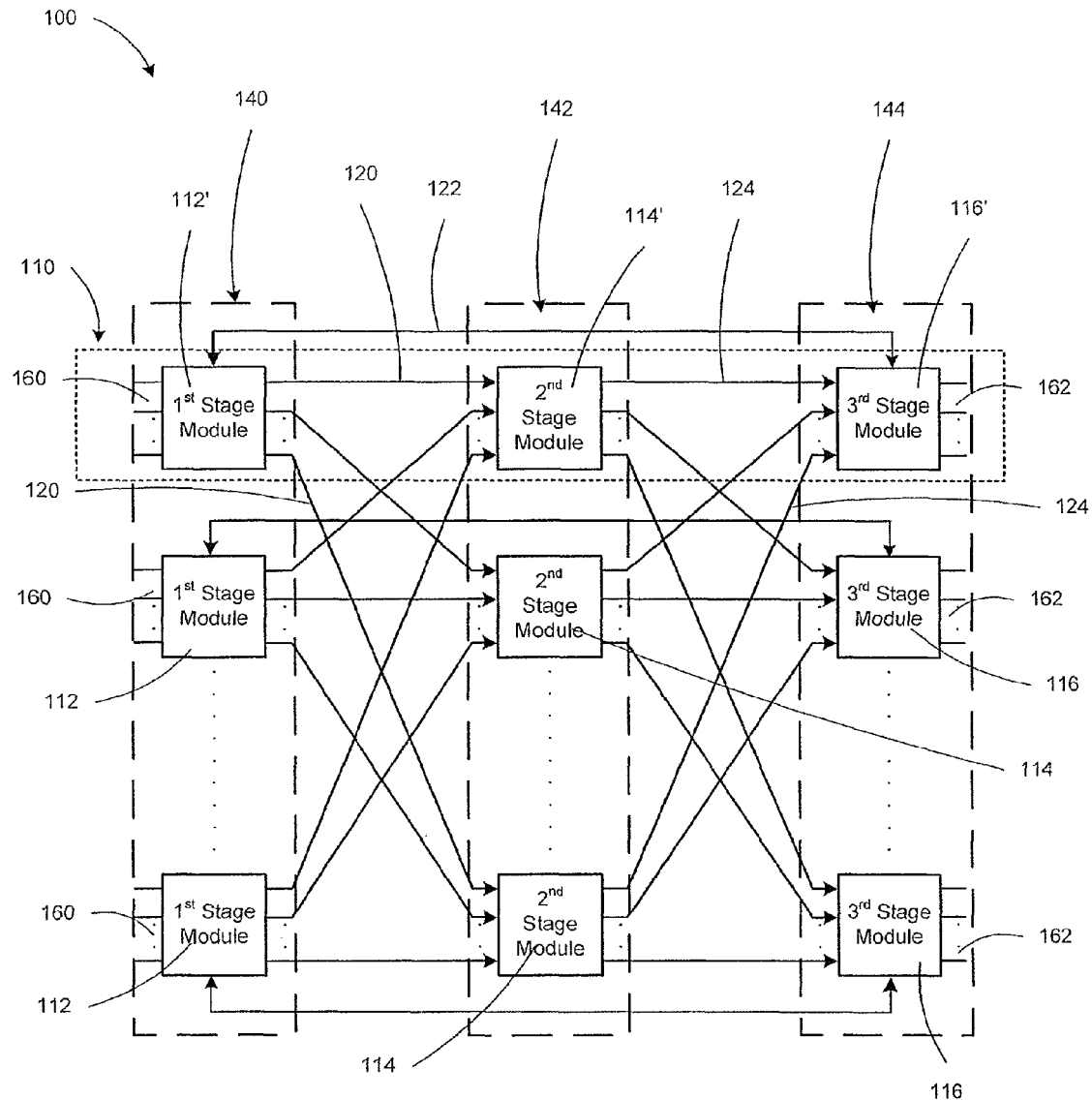
FIG. 1 is a schematic illustration of a switch fabric, according to an embodiment.

In some embodiments, an apparatus includes a module within a first stage of a switch fabric, a module within a second stage of the switch fabric, and a module within a third stage of the switch fabric. The module within the first stage is configured to send data to the module within the second stage. The module within the second stage is configured to send data to the module within the third stage. The module within the second stage is configured to send a first suspension indicator to the module within the third stage. The module within the third stage is configured to send a second suspension indicator to the module within the first stage in response to the first suspension indicator. The module within the second stage does not send the first suspension indicator directly to the module within the first stage because the module within the first stage and the module within the second stage do not have a bidirectional data path between them. The module within the third stage is disposed within a same chip package as the module within the first stage. Thus, the module within the first stage and the module within the third stage are easily coupled to each other by a bidirectional data path such that the second suspension indicator can be sent from the module within the third stage to the module within the first stage. The module within the first stage is configured to stop sending data to the module within the second stage in response to the second suspension indicator.

The terms "first stage", "second stage" and so on refer to portions, modules or nodes within a switch fabric. In some instance, these terms refer to a specific stage within a given switch fabric. For example, a five-stage Clos network includes five consecutive stages from ingress to egress; such a switch fabric has five stages that can be referred to as the "first stage" (the first stage with respect to the ingress to egress direction) through the fifth stage (the fifth and final stage with respect to the ingress to egress direction). For example, FIGS. 1 through 6 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a five-stage Clos network), and the "second stage" can refer to a remaining stage within the switch fabric (e.g., the second stage within the five-stage Clos network). Thus, it should be understood that the specific context will indicate whether the terms "first stage", "second stage" and so on can refer to a specific ordinal stage within a switch fabric or can refer to any particular stage within the switch fabric.

In some embodiments, a method includes sending data from a module within a first stage of a switch fabric to a module within a second stage of the switch fabric. The module within the second stage then sends a suspension indicator to the module within the first stage via a module within a third stage of the switch fabric. The module within the third stage is disposed within a same chip package as the module within the first stage. Thus, the module within the first stage and the module within the third stage are easily coupled to each other such that the suspension indicator can be sent from the module within the second stage to the module within the first stage via the module within the third stage. The module within the first stage is configured to stop sending data to the module within the second stage in response to the suspension indicator sent from the module within the second stage to the module within the first stage via the module within the third stage.

In some embodiments, a processor-readable medium stores code representing instructions to cause a processor to perform a process. The code includes code to receive data from a module within a first stage of a switch fabric. A queue within a memory then buffers the data. The buffered data is forwarded to a module within a second stage of the switch fabric. A suspension indicator is sent to the module within the second stage when an amount of data within the queue exceeds a threshold. The module within the first stage is in close physical proximity to the module within the second stage. Thus, the module within the first stage and the module within the second stage are easily coupled to each other such that the suspension indicator can be sent to the module within the first stage via the module within the second stage. The suspension indicator is configured to stop the module within the first stage from sending data.

In some embodiments, an apparatus includes a module within a first stage of a switch fabric, a module within a second stage of the switch fabric, a module within a third stage of the switch fabric, a first unidirectional data path, a second unidirectional data path, and a bidirectional data path. The first unidirectional data path is configured to facilitate data transfer from the module within the first stage to the module within the second stage. The second unidirectional data path is configured to facilitate data transfer from the module within the second stage to the module within the third stage. The bidirectional data path is configured to facilitate transfer of a flow-control indicator from the module within the third stage to the module within the first stage. Thus, the module within the first stage, the module within the second stage and the module within the third stage can all send flow-control indicators to each other via the unidirectional data paths and/or the bidirectional data path.

FIG. 1 is a schematic illustration of a switch fabric 100, according to an embodiment. Switch fabric 100 is a three-stage non-blocking Clos network and includes a first stage 140, a second stage 142, and a third stage 144. The first stage 140 includes modules 112. Each module 112 of the first stage is an assembly of electronic components and circuitry. In some embodiments, for example, each module is an application-specific integrated circuit (ASIC). In other embodiments, multiple modules are contained on a single ASIC. In still other embodiments, each module is an assembly of discrete electrical components.

In some embodiments, the switch fabric 100 is a cell switched switch fabric. In such an embodiment, each module 112 of the first stage 140 is a cell switch. The cell switches are configured to effectively redirect data as it flows through the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell per time period and all output ports to read one outgoing cell per time period. Each cell switch operates similar to a crossbar switch that can be reconfigured subsequent each time period.

Each module 112 of the first stage 140 includes a set of input ports 160 configured to receive data as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module of the first stage 140 by a unidirectional data path 120. Each unidirectional data path 120 between each module of the first stage 140 and each module 114 of the second stage 142 is configured to facilitate data transfer from the modules 112 of the first stage 140 to the modules 114 of the second stage 142. Because the data paths 120 are unidirectional, they do not facilitate data transfer from the modules 114 of the second stage 142 to the modules 112 of the first stage 140. Such unidirectional data paths 120 cost less, use fewer data connections, and are easier to implement than similar bidirectional data paths.

The unidirectional data paths 120 between the modules 112 of the first stage 140 and the modules 114 of the second stage 142 can be constructed in any manner configured to effectively facilitate data transfer from the modules 112 of the first stage 140 to the modules 114 of the second stage 142. In some embodiments, for example, the data paths are optical connectors between the modules. In other embodiments, the data paths are within a midplane connector. Such a midplane connector can be similar to that described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which are incorporated herein by reference in their entireties. Such a midplane connector can be effectively used to connect each module of the second stage with each module of the first stage. In still other embodiments, the modules are contained within a single chip package and the unidirectional data paths are electrical traces.

The third stage 144 of the switch fabric 100 includes modules 116. The modules 116 of the third stage 144 are structurally similar to the modules 112 of the first stage 140. The number of modules 116 of the third stage 144 is equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is equivalent to the number of input ports 160 of each module 112 of the first stage 140.

Each module 116 of the third stage 144 is connected to each module 114 of the second stage 142 by a unidirectional data path 124. The unidirectional data paths 124 between the modules 114 of the second stage 142 and the modules 116 of the third stage 144 are configured to facilitate data transfer from the modules 114 of the second stage 142 to the modules 116 of the third stage 144. Because the data paths 124 are unidirectional, they do not facilitate data transfer from the modules 116 of the third stage 144 to the modules 114 of the second stage 144. As stated above, such unidirectional data paths 124 cost less and use less area than similar bidirectional data paths.

The unidirectional data paths 120 between the modules 114 of the second stage 142 and the modules 116 of the third stage 144 can be constructed in any manner configured to effectively facilitate data transfer from the modules 114 of the second stage 142 to the modules 116 of the third stage 144. In some embodiments, for example, the data paths are optical connectors between the modules. In other embodiments, the data paths are within a midplane connector. Such a midplane connector can be similar to that described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which have been incorporated herein by reference in their entireties. Such a midplane connector can be effectively used to connect each module of the second stage with each module of the third stage. In still other embodiments, the modules are contained within a single chip package and the unidirectional data paths are electrical traces.

Each module 112 of the first stage 140 is physically proximate to a respective module 116 of the third stage 144. Said another way, each module 112 of the first stage 140 is paired with a module 116 of the third stage 144. For example, in some embodiments, each module 112 of the first stage 140 is within the same chip package of a module 116 of the third stage 144. A bidirectional flow-control path 122 exists between each module 112 of the first stage 140 and its respective module 116 of the third stage 144. The flow-control path 122 allows a module 112 of the first stage 140 to send a flow-control indicator to the respective module 116 of the third stage 144, and vice versa. As described in further detail herein, this allows any module in any stage of the switch fabric to send a flow-control indicator to the module sending it data. In some embodiments, the bidirectional flow-control path 122 is constructed of two separate unidirectional flow control paths. The two separate unidirectional flow control paths allow flow-control indicators to pass between a module 112 of the first stage 140 and a module 116 of the third stage 144.

Figure 2:
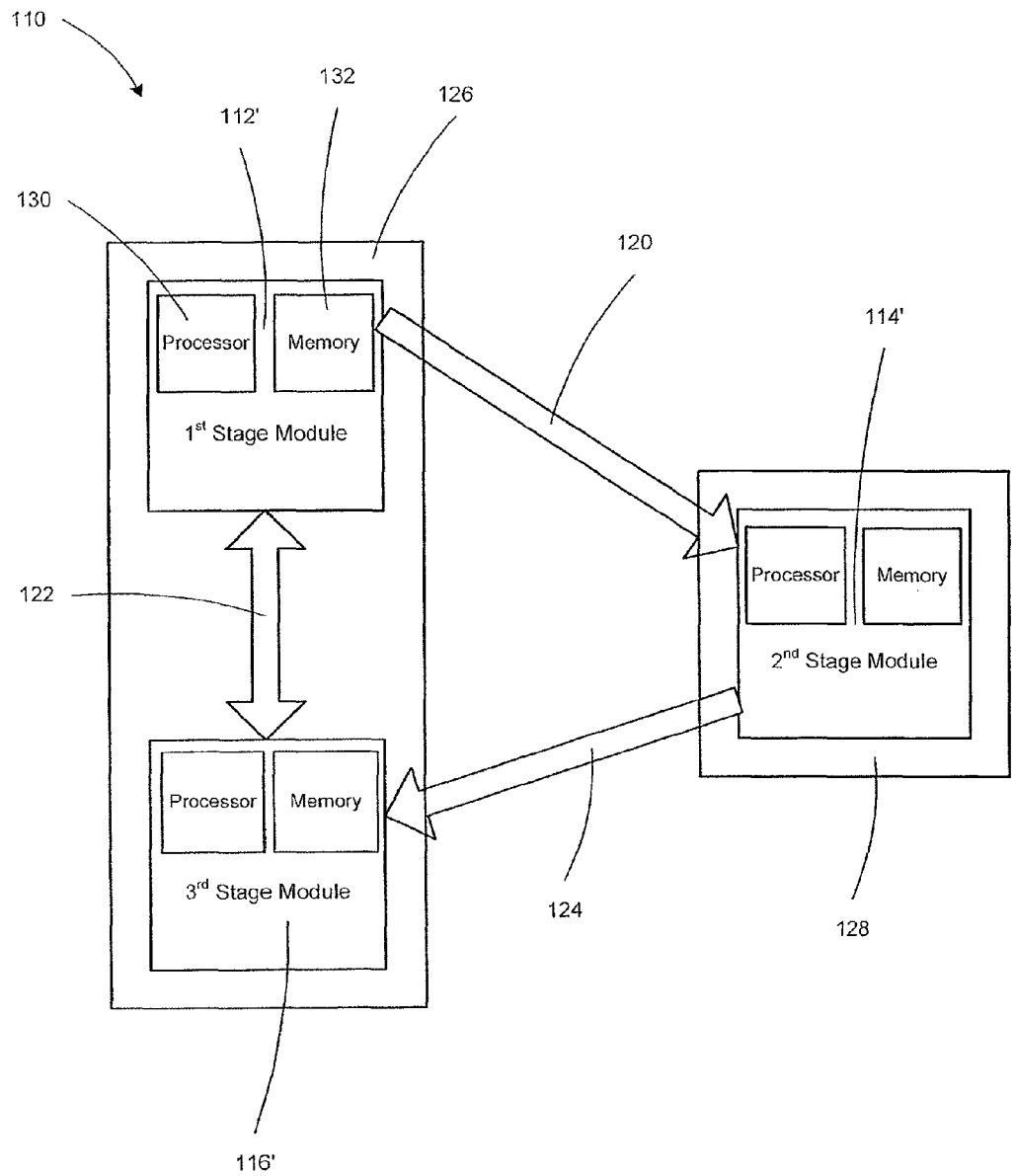
FIG. 2 is a schematic illustration of a portion of the switch fabric of FIG. 1.

FIG. 2 shows a detailed view of a first row 110 of the switch fabric 100. The first row includes a module 112' of the first stage 140, a module 114' of the second stage 142, and a module 116' of the third stage 144. The module 112' of the first stage 140 includes a processor 130 and a memory 132. The processor 130 is configured to control receiving and transmitting data. The memory 132 is configured to buffer data when the module 114' of the second stage 142 cannot yet receive the data and/or the module 112' of the first stage 140 cannot yet send the data. In some embodiments, for example, if the module 114' of the second stage 142 has sent a suspension indicator to the module 112' of the first stage 140, the module 112' of the first stage 140 buffers the data until the module 114' of the second stage 142 can receive the data. Similarly, in some embodiments the module 112' of the first stage 140 can buffer data when multiple data signals are received by the module 112' at substantially the same time (e.g., from multiple input ports). In such embodiments, if only a single data signal can be outputted from the module 112' at a given time (e.g., each clock cycle), the other data signals received can be buffered. Similar to the module 112' of the first stage 140, each module in the switch fabric 100 includes a processor and a memory.

The module 112' of the first stage 140 and its pair module 116' of the third stage 144 are both included on a first chip package 126. This allows the flow-control path 122 between the module 112' of the first stage 140 and the module 116' of the third stage 144 to be easily constructed. For example, the flow-control path 122 can be a trace on the first chip package 126 between the module 112' of the first stage 140 and the module 116' of the third stage. In other embodiments, the module of the first stage and the module of the third stage are on separate chip packages but are in close proximity to each other, which still allows the flow-control path between them to be constructed without using a large amount of wiring and/or a long trace.

The module 114' of the second stage 142 is included on a second chip package 128. The unidirectional data path 120 between the module 112' of the first stage 140 and the module 114' of the second stage 142, and the unidirectional data path 124 between the module of the second stage 114' and the module 116' of the third stage 144 operatively connect the first chip package 126 to the second chip package 128. While not shown in FIG. 2, the module 112' of the first stage 140 and the module 116' of the third stage 144 are also connected to each module of the second stage by unidirectional data paths. As stated above, the unidirectional data path can be constructed in any manner configured to effectively facilitate data transfer between the modules.

The flow-control path 122 and the unidirectional data paths 120, 124 can be effectively used to send flow-control indicators between the modules 112', 114', 116'. For example, if the module 112' of the first stage 140 is sending data to the module 114' of the second stage 142 and the amount of data in the buffer of the module 114' of the second stage 142 exceeds a threshold, the module 114' of the second stage 142 can send a flow-control indicator to the module 116' of the third stage 144 via the unidirectional data path 124 between the module 114' of the second stage 142 and the module 116' of the third stage 144. This flow-control indicator triggers the module 116' of the third stage 144 to send a flow-control indicator to the module 112' of the first stage 140 via the flow-control path 122. The flow-control indicator sent from the module 116' of the third stage 144 to the module 112' of the first stage 140 causes the module 112' of the first stage 140 to stop sending data to the module 114' of the second stage 142. Similarly, flow-control indicators can be sent from the module 114' of the second stage 142 to the module 112' of the first stage 140 via the module 116' of the third stage 144 requesting that data be sent (i.e., resume sending data) from the module 112' of the first stage 140 to the module 114' of the second stage 142.

Having two stages of the switch fabric within the same chip package with an on-chip bidirectional flow-control path between them minimizes the connections between separate chip packages, which can be bulky and/or require a large amount of volume. Additionally, having two stages physically within the same package with an on-chip bidirectional flow-control path between them, allows the data paths between chip packages to be unidirectional while providing an ability for the flow-control communication between a sending module and a receiving module.

While FIGS. 1 and 2 show a switch fabric with three-stages, any number of stages can be used. Clos networks generally have an odd number of stages. Thus, when expanding a three-stage switch fabric to a five-stage switch fabric, the second stage of the three-stage switch fabric can be replaced with a three-stage switch fabric, resulting in a five-stage switch fabric. Further, the middle stage of a five-stage switch fabric can be replaced with a three-stage switch fabric to make a seven stage switch fabric. A five-stage switch fabric can be similar to the five-stage switch fabric described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which have been incorporated herein by reference in their entireties.

Figure 3:
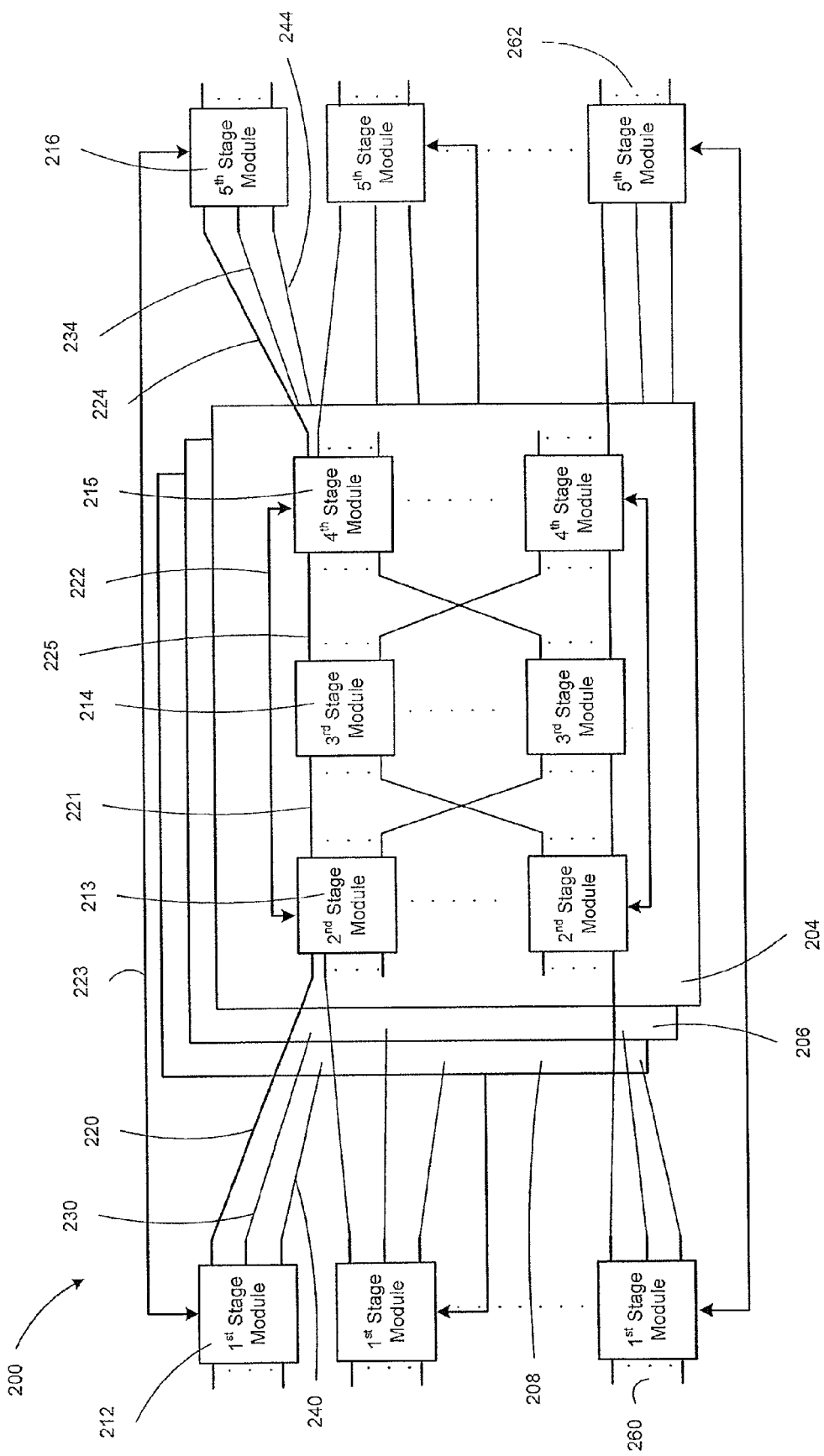
FIG. 3 is a schematic illustration of a switch fabric, according to another embodiment.

FIG. 3 shows a five stage switch fabric 200 including a first switch-fabric plane 204, a second switch-fabric plane 206, and a third switch-fabric plane 208. Each switch-fabric plane contains a three stage switch fabric, similar to the three stage switch fabric 100 described above. Data can be input to any of the three switch-fabric planes 204, 206, 208. Similarly, data can be output from any of the three switch-fabric planes 204, 206, 208. The second switch-fabric plane 206 and the third switch-fabric plane 208 are functionally and structurally similar to the first switch-fabric plane 204, and are therefore not described in detail herein.

The first switch-fabric plane 204 includes modules 213 of a second stage of the switch fabric 200, modules 214 of a third stage of the switch fabric 200, and modules 215 of a fourth stage of the switch fabric 200. Modules 212 of a first stage and modules 216 of a fifth stage of the switch fabric 200 are not included on a switch-fabric plane 204, 206, 208. Each module 212 of the first stage has multiple input ports 260 configured to receive data as it enters the switch fabric. Similarly, each module 216 of the fifth stage has multiple output ports 262 configured to allow data to exit the switch fabric. The number of input ports 260 is equivalent to the number of output ports 262.

Each module 212 of the first stage is operatively coupled to a module 213 of the second stage on each of the switch fabric planes 204, 206, 208 by a unidirectional data path 220, 230, 240. Thus, each module 212 of the first stage can send data to any of the switch fabric planes 204, 206, 208. Within each switch fabric plane 204, each module 213 of the second stage is operatively coupled to each module 214 of the third stage, and each module 214 of the third stage is operatively coupled to each module 215 of the fourth stage, by unidirectional data paths 221, 225, respectively. Each module 213 of the second stage within the switch fabric plane 204 is not operatively coupled to the modules of the third stage within the other switch fabric planes 206, 208. Similarly, each module 214 of the third stage within the switch fabric plane 204 is not operatively coupled to the modules of the fourth stage within the other switch fabric planes 206, 208. Each module 216 of the fifth stage is operatively coupled to a module 215 of the fourth stage on each of the switch fabric planes 204, 206, 208 by a unidirectional data path 224, 234, 244. Thus, each switch fabric plane 204, 206, 208 can send data to any of the modules 216 of the fifth stage. The unidirectional data paths 220, 230, 240, 221, 225, 224, 234, 244 are configured to transfer data through the switch fabric 200.

Because the first stage includes the same number of modules as the fifth stage, each module 212 of the first stage can be paired with a module 216 of the fifth stage. A bidirectional flow-control path 223 exists between each module 212 of the first stage and its pair module 216 of the fifth stage. The flow-control path 223 allows the module 212 of the first stage to send a flow-control indicator to its pair module 216 of the fifth stage, and vice versa. In some embodiments, each module 212 of the first stage is within a same chip package as its pair module 216 of the fifth stage.

Similarly, because the second stage includes the same number of modules as the fourth stage, each module 213 of the second stage is paired with a module 215 of the fourth stage. Additionally, each module 213 of the second stage is paired with a module 215 of the fourth stage that is on the same switch fabric plane as the module 213 of the second stage. A bidirectional flow-control path 222 exists between each module 213 of the second stage and its pair module 215 of the fourth stage. The flow-control path 222 allows the module 213 of the second stage to send a flow-control indicator to the module 215 of the fourth stage, and vice versa. In some embodiments, each module 213 of the second stage is within a same chip package as its pair module 215 of the fourth stage. As discussed above and in further detail herein, the flow-control paths 222, 223 allow any module in any stage of the switch fabric to send a flow-control indicator to the module sending it data.

Figure 4:
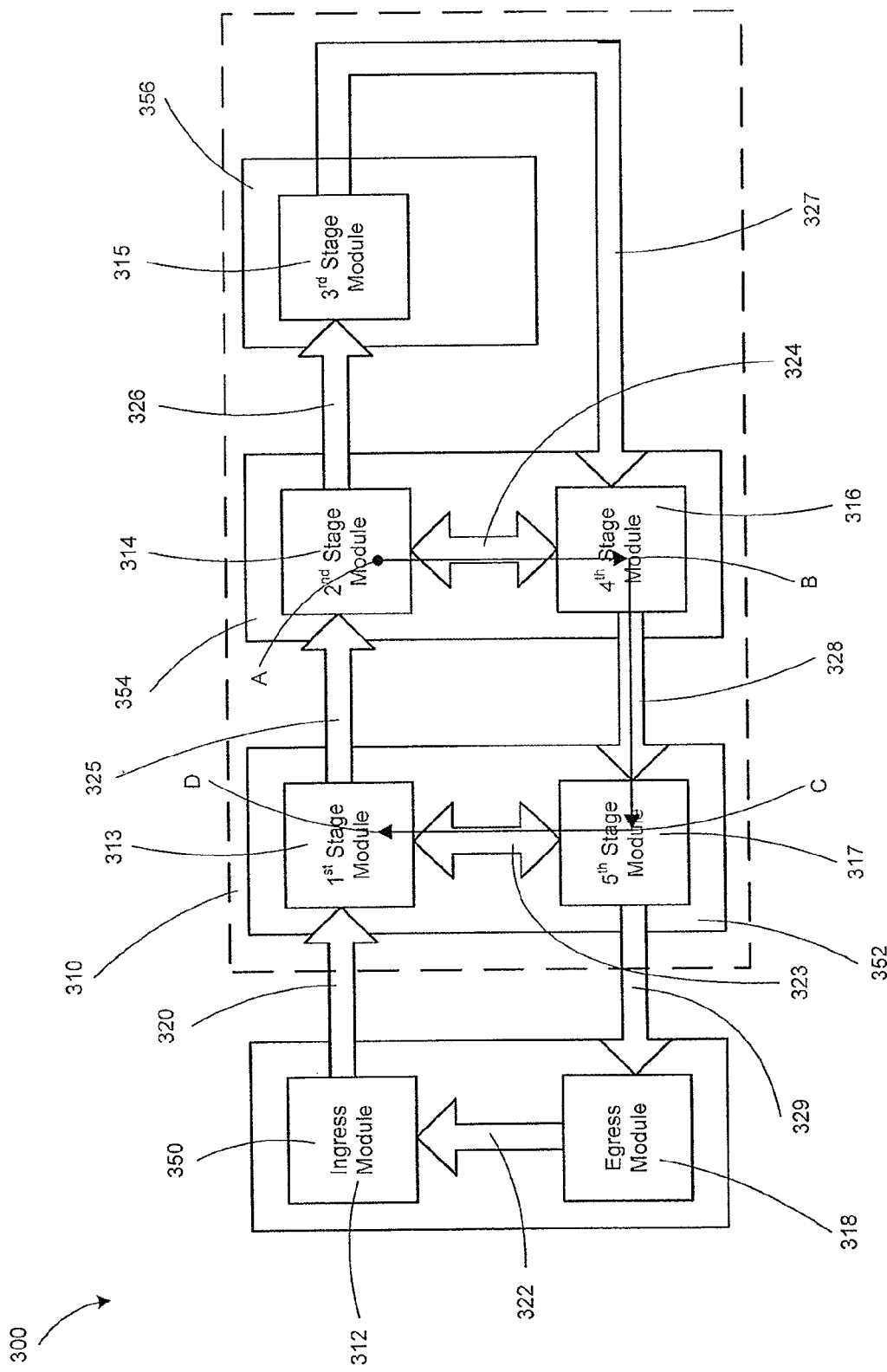
FIGS. 4-5 are schematic illustrations of a portion of a switch fabric, according to another embodiment.
Figure 5:
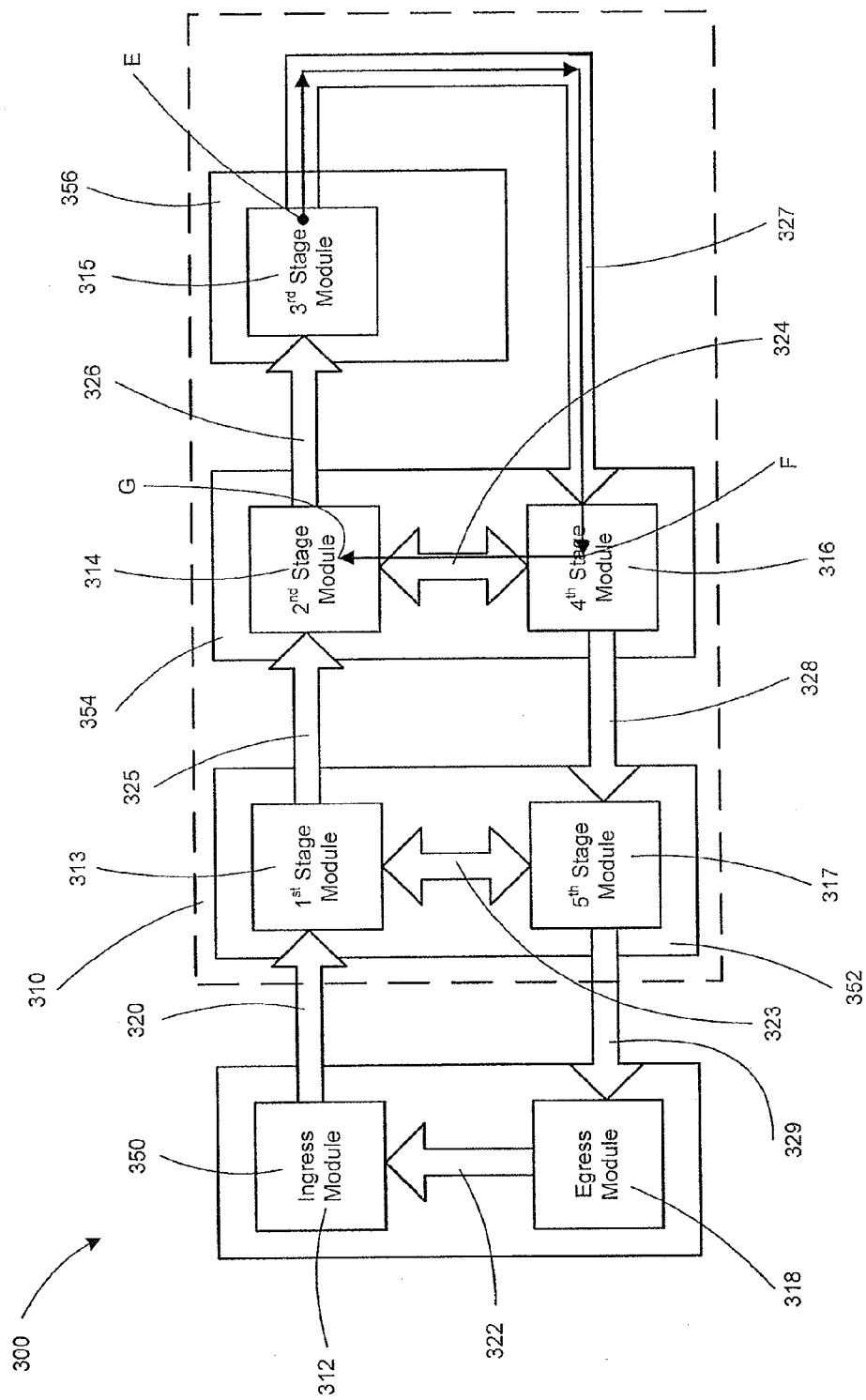

FIGS. 4-5 are schematic illustrations of a portion of a switch fabric system 300 having a switch fabric 310, according to an embodiment. The portion of the switch fabric system 300 illustrates a hypothetical data path between an ingress module 312 configured to send data to the switch fabric 310 and an egress module 318 configured to receive data from the switch fabric 310.

The portion of the switch fabric system 300 includes a first chip package 350, a second chip package 352, a third chip package 354 and a fourth chip package 356. The first chip package 350 includes an ingress module 312 and an egress module 318. The first chip package 350 also includes a unidirectional flow-control path 322 that operatively couples the egress module 318 with the ingress module 312. The egress module 318 is configured to send flow-control indicators to the ingress module 312 via the unidirectional flow-control path 322, as further described herein. In other embodiments, the flow-control path that operatively couples the egress module with the ingress module is bidirectional such that the ingress module can both send data to and receive data from the egress module.

The ingress module 312 is configured to send data to the switch fabric 310, and the egress module 318 is configured to receive data from the switch fabric 310. In some embodiments, for example, the ingress module 312 is a data source module and the egress module 318 is a data sync module.

The second chip package 352 includes a module 313 within a first stage of the switch fabric 310, a module 317 within the fifth stage of the switch fabric 310, and a bidirectional flow-control path 323 that operatively couples the module 313 within the first stage with the module 317 within the fifth stage. The module 313 within the first stage and the module 317 within the fifth stage can be similar to the modules described above. In some embodiments, for example, the module 313 within the first stage and the module 317 within the fifth stage are cell switches.

The third chip package 354 includes a module 314 within the second stage, a module 316 within the fourth stage, and a bidirectional flow-control path 324 that operatively couples the module 314 within the second stage with the module 316 within the fourth stage. The module 314 within the second stage and the module 316 within the fourth stage are substantially similar to the module 313 within the first stage. The second chip package 352, and the third chip package 354 are substantially similar. This allows multiple instances of a single ASIC to be used for the second chip package 352, and the third chip package 354. In other embodiments, each individual module is an instance of an ASIC. Using multiple instances of a single ASIC to be used for multiple parts of the system, reduces the manufacturing cost of the switch fabric.

The fourth chip package 356 includes a module 315 within the third stage. While the fourth chip package 356 is shown in FIGS. 4 and 5 as only having a single module, in other embodiments, the ASIC used for the second chip package 352, and the third chip package 354 is also used for the fourth chip package. In such an embodiment, the second module on the fourth chip package can be used as a module within a third stage of a second switch fabric. In this manner, both modules on the fourth chip package can be used. In other embodiments, the second module on the fourth chip package is left unconnected. In other embodiments, the modules within the second chip package, the modules within the third chip package, and the module within the fourth chip package are instances of a single ASIC.

The ingress module 312 is operatively coupled to the module 313 within the first stage by a unidirectional data path 320. Similar unidirectional data paths 325, 326, 327, 328, 329 operatively couple the module 313 within the first stage to the module 314 within the second stage, the module 314 within the second stage to the module 315 within the third stage, the module 315 within the third stage to the module 316 within the fourth stage, the module 316 within the fourth stage to the module 317 within the fifth stage, and the module 317 within the fifth stage to the egress module 318, respectively. The unidirectional data paths 320, 325, 326, 327, 328, 329 allow data to pass through the switch fabric.

Using the unidirectional data paths 325, 326, 327, 328, 329, the unidirectional flow-control path 322 and the bidirectional flow-control paths 323, 324, any of the modules can send a flow-control indicator to the module sending it data. A flow-control indicator can be any signal configured to help control the flow of data from one module to the other. For example, the flow-control indicator can be a signal to start sending data, to stop sending data, to send data at a slower rate, to send data at a faster rate, to pause sending data for a period of time, and/or the like.

The signals sent across the unidirectional data paths do not include routing information. This is in contrast to the signals sent across the bidirectional flow-control paths that contain routing information.

FIG. 4 illustrates an example of how the module 314 within the second stage sends a flow-control indicator, such as a suspension indicator or an actuation indicator, to the module 313 within the first stage. For example, if an amount of data in a memory used to buffer data in the module 314 within the second stage, received from a module 313 within the first stage, exceeds a threshold, the module 314 within the second stage (the initiator) communicates to the module 313 within the first stage (the target) to stop sending data. If the module 314 within the second stage fails to communicate with the module 313 within the first stage, data could be lost because the module 314 within the second stage will not have enough storage space to buffer the data.

To communicate to the module 313 within the first stage (the target) to stop sending data, the module 314 within the second stage (the initiator) sends a flow-control indicator (i.e., a suspension indicator) across bidirectional flow-control path 324 to the module 316 within the fourth stage (module 314's pair). This is shown in FIG. 4 as sending the flow-control indicator between point A and point B.

Sending the flow-control indicator from the module 314 within the second stage to the module 316 within the fourth stage triggers the module 316 within the fourth stage to send a flow-control indicator across unidirectional data path 328 to the module 317 within the fifth stage. This is shown in FIG. 4 as sending the flow-control indicator between point B and point C. While many modules within the fifth stage are present and are operatively coupled to the module 316 within the fourth stage via unidirectional data paths (not shown in FIG. 4), the module 316 within the fourth stage sends the flow-control indicator to the module 317 within the fifth stage that is paired with the module 313 within the first stage that is sending data to the module 314 within the second stage. Said another way, the module 316 within the fourth stage is not necessarily in the same row of the switch fabric as the module 317 within the fifth stage. The module 313 within the first stage, however, is within the same row of the switch fabric as the module 317 within the fifth stage.

The flow-control indicator sent to the module 317 within the fifth stage triggers the module 317 within the fifth stage to send the flow-control indicator to the module 313 within the first stage via the bidirectional flow-control path 323. This is shown in FIG. 4 as sending the flow-control indicator between point C and point D. The module 313 within the first stage stops sending data to the module 314 within the second stage in response to the flow-control indicator. A flow-control indicator configured to cause the module 313 within the first stage to resume sending data to the module 314 within the second stage can similarly be sent from the module 314 within the second stage to the module 313 within the first stage once the module 314 within the second stage has space to buffer the data.

FIG. 5 illustrates an example of how the module 315 within the third stage (the initiator) sends a flow-control indicator, such as a suspension indicator or an actuation indicator, to the module 314 within the second stage (the target). For example, if an amount of data in a memory used to buffer data in the module 315 within the third stage, received from a module 314 within the second stage, exceeds a threshold, the module 315 within the third stage communicates to the module 314 within the second stage to stop sending data. If the module 315 within the third stage fails to communicate with the module 314 within the second stage, data could be lost because the module 315 within the third stage will not have enough storage space to buffer the data.

To communicate to the module 314 within the second stage (the target) to stop sending data, the module 315 within the third stage (the initiator) sends a flow-control indicator (i.e., a suspension indicator) via the unidirectional data path 327 to the module 316 within the fourth stage that is paired with the module 314 within the second stage (i.e., the module 314 within the second stage is within the same row of the switch fabric 310 as the module 316 within the fourth stage). This is shown in FIG. 5 as sending the flow-control indicator between point E and point F. While many modules within the fourth stage are present and are operatively coupled to the module 315 within the third stage via unidirectional data paths (not shown in FIG. 5), the module 315 within the third stage sends the flow-control indicator to the module 316 within the fourth stage that is paired with the module 314 within the second stage (i.e., the module that is sending data to the module 314 within the second stage). This triggers the module 316 within the fourth stage to send a flow-control indicator via the bidirectional flow-control path 324 to the module 314 within the second stage. This is shown in FIG. 5 as sending the flow-control indicator between point F and point G. Said another way, the module 316 within the fourth stage is not necessarily in the same row of the switch fabric as the module 315 within the third stage. The module 316 within the fourth stage, however, is within the same row of the switch fabric as the module 314 within the second stage.

The module 314 within the second stage stops sending data to the module 315 within the third stage in response to the flow-control indicator. A flow-control indicator configured to cause the module 314 within the second stage to resume sending data to the module 315 within the third stage can similarly be sent from the module 315 within the third stage to the module 314 within the second stage once the module 315 within the third stage has space to buffer the data.

The examples provided in FIGS. 4 and 5 illustrate how the flow-control indicators use the unidirectional data paths 320, 325, 326, 327, 328, 329, the unidirectional flow-control path 322, and the bidirectional flow-control paths 323, 324 to send flow-control indicators. While FIGS. 4 and 5 show two examples, any module can send a flow-control indicator to the module sending it data via the unidirectional data paths 320, 325, 326, 327, 328, 329, the unidirectional flow-control path 322, and the bidirectional flow-control paths 322, 323, 324. Additionally, FIG. 4 illustrates the longest possible path that a flow-control indicator takes to reach its destination (i.e., through 2 intermediate modules).

Figure 6:
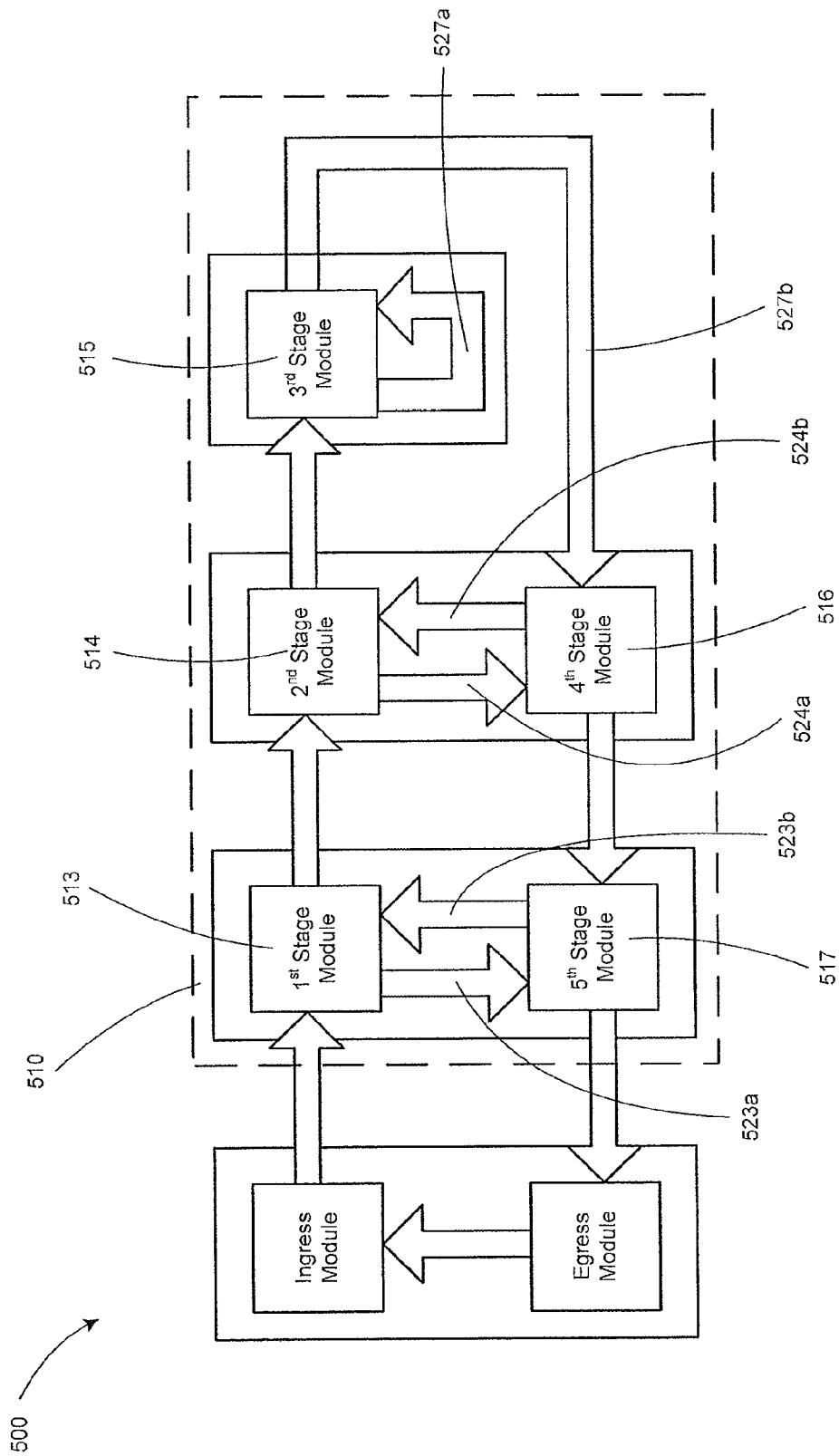
FIG. 6 is a schematic illustrations of a portion of a switch fabric, according to another embodiment.

While shown as bidirectional flow-control paths in FIGS. 4-5, in some embodiments, each bidirectional flow-control path can be constructed as two unidirectional flow-control paths. FIG. 6, for example, shows a portion of a switch fabric system 500 having a switch fabric 510. The switch fabric system 500 is substantially similar to the switch fabric system 300, described above but with the bidirectional flow-control paths 323, 324 each being replaced with two unidirectional flow-control paths 523a, 523b, 524a, 524b. In such a manner, the module 513 within the first stage and the module 514 within the second stage can send flow-control signals to their pairs (module 517 and module 516, respectively) via unidirectional flow-control paths 523a, 524a, respectively, and can receive flow-control signals from their pairs via unidirectional flow-control paths 523b, 524b, respectively.

Additionally, FIG. 6 shows an embodiment of the invention where the module 515 within the third stage of the switch fabric 510 uses an instance of the ASIC used for the modules 513, 514, 516, 517 within the first stage, the second stage, the fourth stage, and the fifth stage, respectively. When an instance of the ASIC used for the modules 513, 514, 516, 517 is also used for the module 515, the module 515 has a pair to which to send flow-control signals. In such an embodiment, a unidirectional data path 527a is constructed between the module 515 within the third stage and itself. In this manner, the module 515 within the third stage is paired with itself. Said another way, the portion of the module 515 that sends flow control signals is operatively coupled to the portion of the module 515 that receives flow control signals. Accordingly, when the module 515 within the third stage sends a flow-control indicator to its pair, it sends the flow-control indicator to itself via the unidirectional data path 527a. In such an embodiment, each flow-control indicator passes through two intermediate modules before reaching its destination. For example, if the module 515 within the third stage sends a flow-control indicator to the module 514 within the second stage, the flow-control indicator is sent from the module 515 within the third stage to itself (i.e., the module 515 within the third stage) via the unidirectional flow-control path 527a, from the module within the third stage 515 to the module within the fourth stage 516 via the unidirectional data path 527b, and from the module 516 within the fourth stage to the module within the second stage 514 via the unidirectional flow-control path 524b.

In other embodiments, four unidirectional flow-control paths can exist between a module and its pair. In such an embodiment, two of the unidirectional flow-control paths enable the module to send flow-control indicators to its pair and the remaining two unidirectional flow-control paths enable the module's pair to send flow-control indicators to the module. Thus, each module can receive flow-control indicators from its pair via a first unidirectional flow-control path and a second unidirectional flow-control path. Data that is to be forwarded to a different stage (i.e., the next stage) is sent to the module via the first unidirectional flow-control path. Data that is intended for the module (i.e., when the module is the target module) is sent from the module's pair to the module via the second unidirectional flow-control path. In this manner, the module can process the flow-control indicator (i.e., either forward the flow-control indicator or act according to the flow-control indicator). In other embodiments, the first unidirectional flow-control path and the second unidirectional flow-control path are different portions of a single unidirectional flow-control path or a single bidirectional flow-control path. In still other embodiments, the receiving module can determine how to process the flow-control indicator by the form of the flow-control indicator and/or values within the flow-control indicator, as described in further detail herein.

Figure 7:
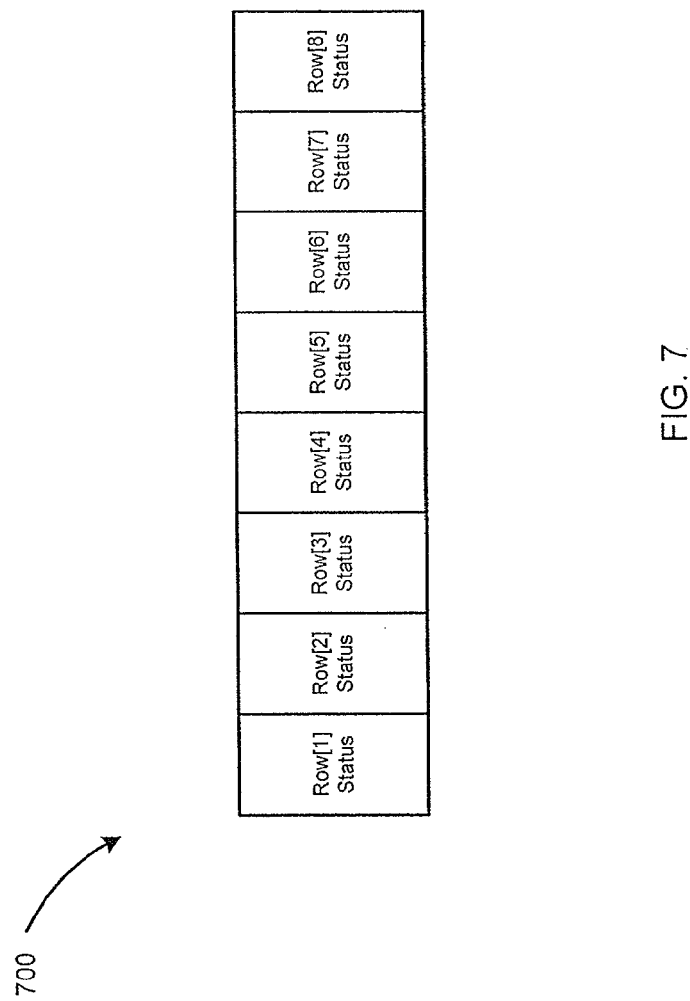
FIG. 7 is a schematic illustration of a flow-control indicator, according to another embodiment.

FIG. 7 shows a schematic illustration of an eight bit status vector 700 that can be used as a flow-control indicator. The position of each bit in the status vector 700 corresponds to a particular row in a switch fabric. For example, the first position (Row[1]) in the status vector 700 corresponds to the first row in a switch fabric. Similarly, the eighth position (Row[8]) in the status vector 700 corresponds to the eighth row in the switch fabric. While the status vector 700 is shown having eight bits, any number of bits, corresponding to the number of modules in each stage of the switch fabric, can be used. For example, if each stage in the switch fabric has "i" modules, the status vector 700 will have "i" bits. In other embodiments, the number of modules in each stage can vary, and thus the length of the status vectors can vary, accordingly.

The values of each bit in the status vector 700 indicate the status of the receiving module. In some embodiments, for example, a "0" can indicate that the receiving module can receive additional data from a particular module, and a "1" can indicate that the receiving module's buffer is full and that a sending module should suspend sending data to the receiving module. In other embodiments, the values of each bit in the status vector 700 can indicate to a sending module to send data, to stop sending data, to send data at a slower rate, to send data at a faster rate, to pause sending data for a period of time, and/or the like.

In some embodiments, the status vector includes a separate bit to indicate to a receiving module how to process the status vector 700 (e.g., either forward the status vector or act according to the status vector). For example, a bit within the status vector can be set to a "0" if the receiving module should forward the status vector to the next stage, and the bit within the status vector can be set to a "1" if the receiving module is the target module (e.g., the receiving module should act according to the status vector). In some embodiments, only the status vectors sent between a module and its pair (e.g., modules within a same chip package) include a separate bit. In such embodiments, when a module receives a status vector from another module via a unidirectional data path, the receiving module automatically forwards the status vector to its pair. In other embodiments, separate flow-control paths are used such that the receiving module can appropriately process the status vector, as described above.

Figure 8:
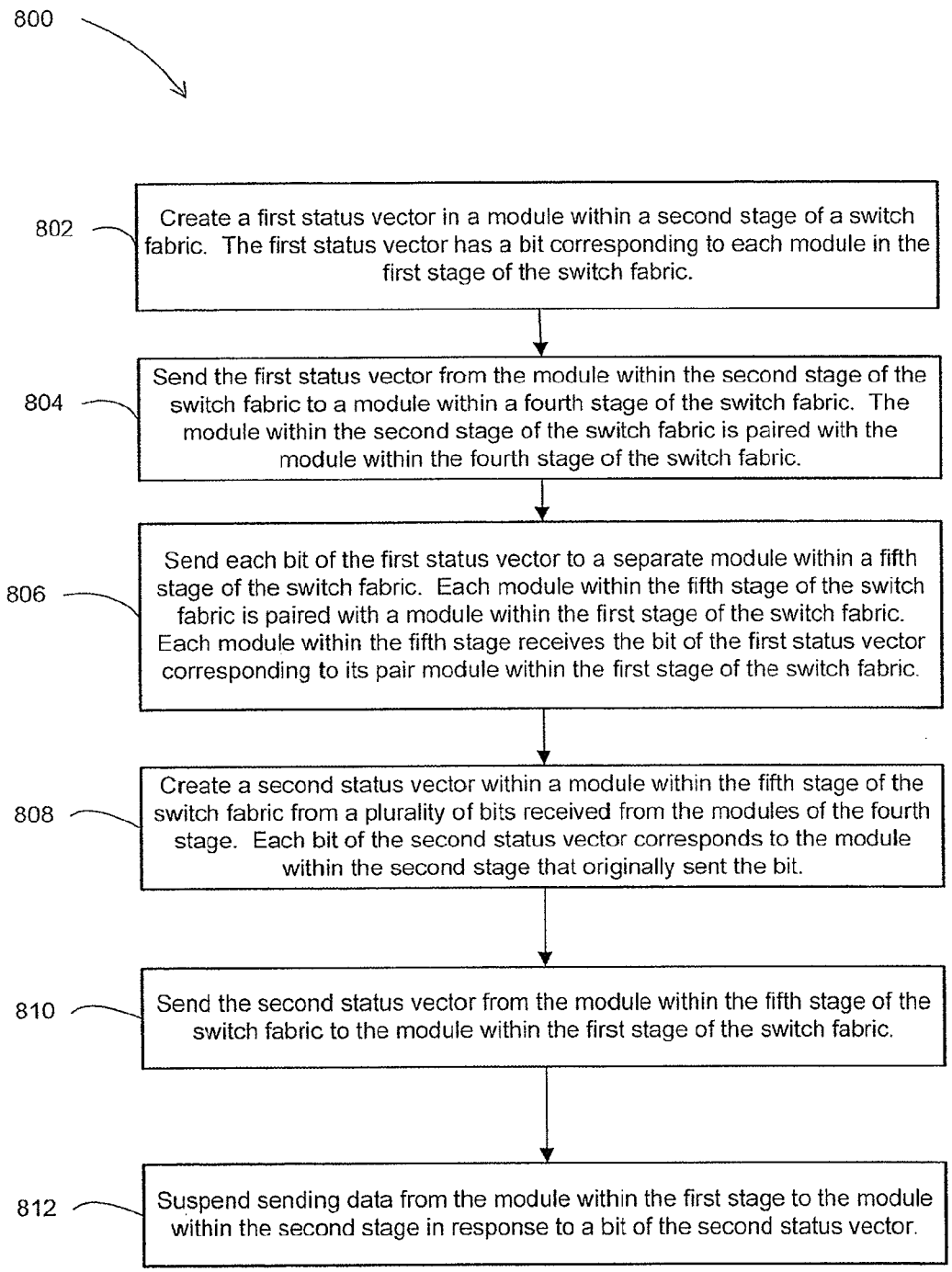
FIG. 8 is a flow chart illustrating a method, according to another embodiment.

FIG. 8 is a flow chart illustrating a method of using a status vector 700 to send data from a second stage within a switch fabric to a first stage within a switch fabric, such as shown in FIG. 4. A first status vector in a module 314 within a second stage of a switch fabric 310 is created, at 802. The module 314 within the second stage sets each bit in the first status vector to either a "0" or a "1" corresponding to whether the module 314 within the second stage can receive data from the modules of the first stage. For example, if the module 313 is in the first row of the first stage and the module 314 cannot receive any additional data from the module 313, the first bit (Row [1]) of the first status vector 700 is set to "1". Additionally, if the module 314 cannot receive additional data from the module in the second row of the first stage, the second bit (Row[2]) is set to "1". The other bits in the first status vector 700 are similarly set.

The first status vector 700 is then sent to module 316 within the fourth stage (module 314's pair) via the bidirectional data path 324, at 804. In some embodiments, each bit of the first status vector 700 can be sent serially from a module and its pair (e.g., the module 314 and the module 316) using a time-division-multiplexed signal and/or any other technique configured to serially transfer multiple bits. In other embodiments, each bit of the first status vector can be sent in parallel between a module and its pair. In such an embodiment, each bidirectional data path can include multiple control lines each configured to carry a single bit of the first status vector.

The module 316 then sends each bit of the first status vector 700 to the module within the fifth stage that corresponds to the position of the bit within the first status vector 700, at 806. For example, if the module 317 is in the first row of the fifth stage, the first bit (Row[1]) of the first status vector 700 is sent to the module 317. Similarly, the second bit (Row[2]) of the first status vector 700 is sent to the module in the second row of the fifth stage, and so forth.

Each module within the fourth stage similarly sends a single bit of a status vector 700 to each module 317 within the fifth stage. Accordingly, each module 317 within the fifth stage can construct a second status vector from the bits received from the modules within the fourth stage, at 808. The second status vector is structurally similar to the first status vector 700. The status bit that the module 317 receives from the module in the first row of the fourth stage is placed in the first bit (Row[1]) of the second status vector, the status bit that the module 317 receives from the module in the second row of the fourth stage is placed in the second bit (Row[2]) of the second status vector, and so forth.

Each module 317 of the fifth stage can then send the second status vector to the module 313 of the first stage that is its pair, at 810. Each bit of the second status vector is sent between a module and its pair (e.g., module 317 and module 313) similar to each bit of the first status vector being sent between a module and its pair, as described above.

The module 313 within the first stage suspends sending data to the module 314 within the second stage in response to receiving the bit set to "1" in the second status vector that corresponds to module 314 within the second stage, at 812. Because each bit of the second status vector corresponds to a module within the second stage, each module of the first stage can then determine which modules of the second stage to stop sending data to and which modules of the second stage to resume sending data to based on the position and value of each bit within the second status vector. For example, if the first bit (Row[1]) of the second status vector is a "1" then the module 313 within the first stage will suspend sending data to the module 314 within the first row of the second stage. Similarly, if the second bit (Row[2]) of the second status vector is a "0" then the module 313 within the first stage will resume and/or continue sending data to the module within the second row of the second stage.

Figure 9:
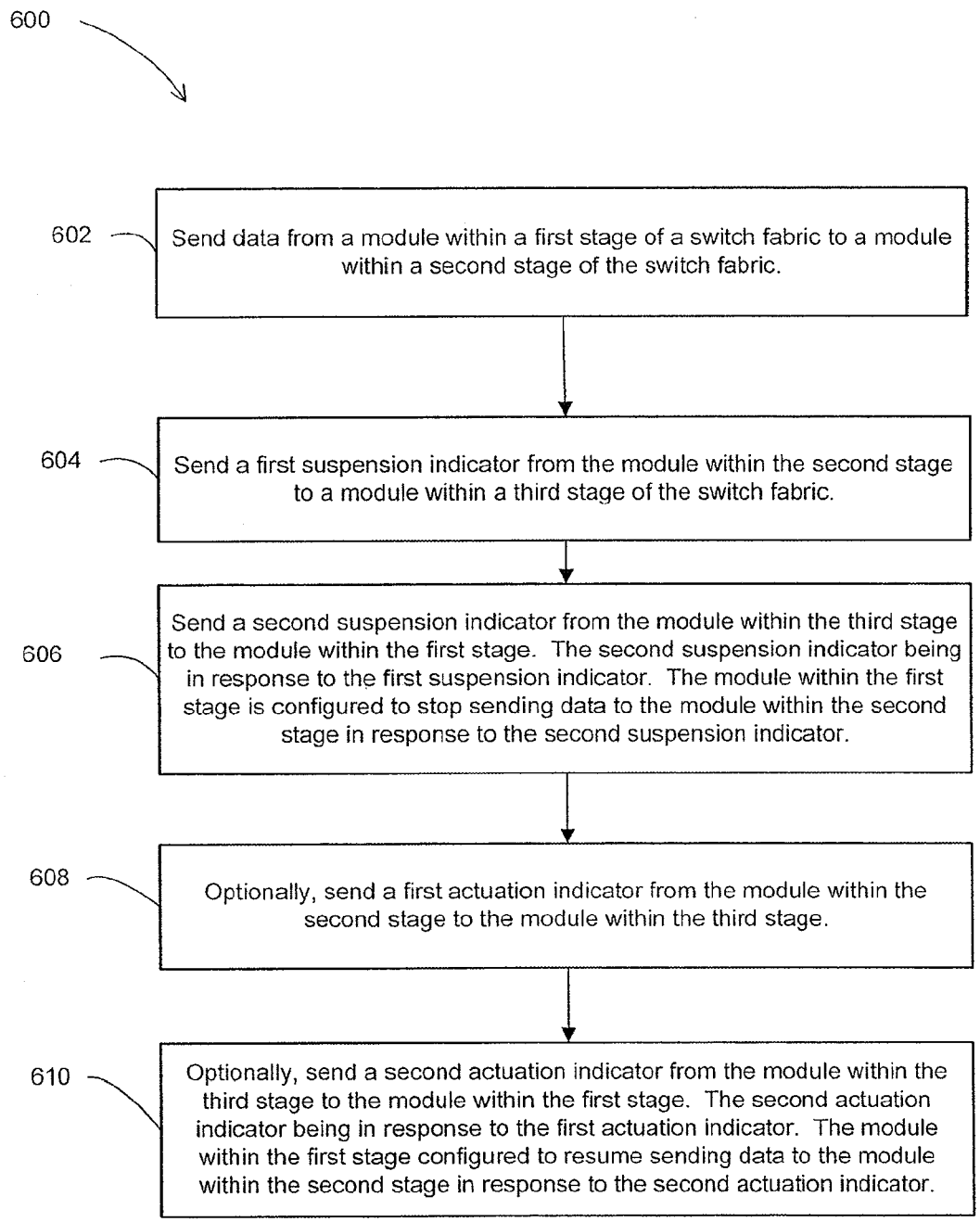
FIG. 9 is a flow chart illustrating a method, according to another embodiment.

FIG. 9 is a flow chart illustrating a method of controlling the data flow of a switch fabric, according to an embodiment. The method 600 includes sending data from a module within a first stage of a switch fabric to a module within a second stage of the switch fabric, at 602. A first suspension indicator is then sent from the module within the second stage to a module within a third stage of the switch fabric, at 604. A second suspension indicator is then sent from the module within the third stage to the module within the first stage, at 606. The second suspension indicator is in response to the first suspension indicator. The module within the first stage is configured to stop sending data to the module within the second stage in response to the second suspension indicator. A first actuation indicator is then optionally sent from the module within the second stage to the module within the third stage, at 608. A second actuation indicator is then optionally sent from the module within the third stage to the module within the first stage, at 610. The second actuation indicator is in response to the first actuation indicator. The module within the first stage is configured to resume sending data to the module within the second stage in response to the second actuation indicator.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, while the systems and methods described above have been described in relation to a Clos network, the systems and methods can be used with any type of switch fabric and/or network.

Although various embodiments have been described as having particular features and/or combinations of components, other embodiments are possible having a combination of any features and/or components from any of embodiments where appropriate. In some embodiments, for example, any of the described switch fabrics can include any number of stages. In other embodiments, for example, any of the switch fabrics can include multiple switch-fabric planes, such as those described above in relation to switch fabric 200. In still other embodiments, any of the bidirectional data paths and/or flow-control paths can be constructed of multiple unidirectional data paths and/or unidirectional flow-control paths. Similarly, in other embodiments, any of the unidirectional data paths and/or unidirectional flow-control paths can be constructed of multiple unidirectional data paths and/or unidirectional flow-control paths.

What is claimed is:

1. An apparatus, comprising:
   a first switch module including a queue within a memory to buffer data, the first switch module configured to be within a first stage of a switch fabric, the first switch module configured to receive data from a second switch module within a second stage of the switch fabric and within a chip package that also includes a third switch module within a third stage of the switch fabric,
   the first switch module configured to send data to the third switch module, the first switch module configured to send, in response to an amount of data within the queue crossing a threshold, a suspension indicator to the third switch module to stop the second switch module from sending data to the first switch module.

2. The apparatus of claim 1, wherein the suspension indicator is a first suspension indicator, the first switch module configured to send the first suspension indicator to the third switch module such that the third switch module sends a second suspension indicator to the second switch module, in response to the first suspension indicator, to stop the second switch module from sending data to the first switch module.

3. The apparatus of claim 1, wherein the suspension indicator is a first suspension indicator, the first switch module configured to send the first suspension indicator to the third switch module via a unidirectional data path such that the third switch module sends a second suspension indicator to the second switch module via a bidirectional data path and in response to the first suspension indicator to stop the second switch module from sending data to the first switch module.

4. The apparatus of claim 1, wherein the first switch module is within a chip package distinct from the chip package containing the second switch module and the third switch module.

5. The apparatus of claim 1, wherein the first switch module is configured to send the suspension indicator to the third switch module when the first switch module is unable to receive additional data from the second switch module.

6. The apparatus of claim 1, wherein the first switch module is configured to send a first actuation indicator to the third switch module such that the third switch module sends a second actuation indicator to the second switch module, in response to the first actuation indicator, to cause the second switch module to send data to the first switch module.

7. The apparatus of claim 1, wherein the first switch module is configured to receive data from the second switch module via a first unidirectional data path, the first switch module configured to send data to the third switch module via a second unidirectional data path, the first switch module configured to send the suspension indicator to the third switch module via the second unidirectional data path.

8. A method, comprising:
receiving, at a first switch module in a switch fabric, data from a second switch module within a chip package in the switch fabric;
storing the data in a queue at the first switch module; and
sending a suspension indicator to a third switch module within the chip package (1) in response to an amount of data stored in the queue crossing a threshold, and (2) to stop the second switch module from sending data to the first switch module.

9. The method of claim 8, wherein the first switch module is within a first stage of the switch fabric, the second switch module is within a second stage of the switch fabric, the third switch module is within a third stage of the switch fabric.

10. The method of claim 8, wherein the suspension indicator is a first suspension indicator, the sending includes sending the first suspension indicator to the third switch module such that the third switch module sends a second suspension indicator to the second switch module (1) in response to the first suspension indicator, and (2) to stop the second switch module from sending data to the first switch module.

11. The method of claim 8, wherein the receiving includes receiving data from the second switch module via a first unidirectional data path, the sending includes sending the suspension indicator to the third switch module via a second unidirectional data path different from the first unidirectional data path.

12. The method of claim 8, wherein the threshold is a first threshold, the amount of data stored in the queue is a first amount of data, the method further comprising:

sending an actuation indicator to the third switch module (1) in response to a second amount of data stored in the queue crossing a second threshold, and (2) to cause the second switch module to send data to the first switch module.

13. The method of claim 8, wherein the first switch module is within a chip package distinct from the chip package containing the second switch module and the third switch module.

14. An apparatus, comprising:
a first switch module configured to be within a switch fabric, the first switch module being within a first chip package that includes a second switch module, the first switch module configured to send data to a third switch module within a second chip package that includes a fourth switch module,
the first switch module configured to receive a first suspension indicator from the second switch module, the first switch module configured to send a second suspension indicator to the third switch module (1) in response to the first suspension indicator, and (2) to stop the fourth switch module from sending data to the second switch module.

15. The apparatus of claim 14, wherein the first switch module is within a first stage of the switch fabric, the second switch module is within a second stage of the switch fabric, the third switch module is within a third stage of the switch fabric, the fourth switch module is within a fourth stage of the switch fabric.

16. The apparatus of claim 14, wherein the first switch module is configured to send the second suspension indicator to the third switch module such that the third switch module sends a third suspension indicator to the fourth switch module (1) in response to the second suspension indicator, and (2) to stop the fourth switch module from sending data to the second switch module.

17. The apparatus of claim 14, wherein the first switch module is configured to send data to the third switch module via a unidirectional data path, the first switch module configured to receive the first suspension indicator from the second switch module via a bidirectional data path, the first switch module configured to send the second suspension indicator to the third switch module via the unidirectional data path.

18. The apparatus of claim 14, wherein the first switch module is configured to receive a first actuation indicator from the second switch module, the first switch module configured to send a second actuation indicator to the third switch module (1) in response to the first actuation indicator, and (2) to cause the fourth switch module to send data to the second switch module.

19. The apparatus of claim 14, wherein the first switch module is configured to receive data from a fifth switch module within the switch fabric, the first switch module configured to receive a fourth suspension indicator from the fifth switch module, the first switch module configured to send a fifth suspension indicator to the second switch module (1) in response to the fourth suspension indicator, and (2) to stop the second switch module from sending data to the fifth switch module.

* * * * *